Oct. 27, 1936.  P. S. DENNING  2,058,959
METHOD OF SEPARATING FOREIGN MATTER FROM VERMICULITE
Filed March 5, 1934
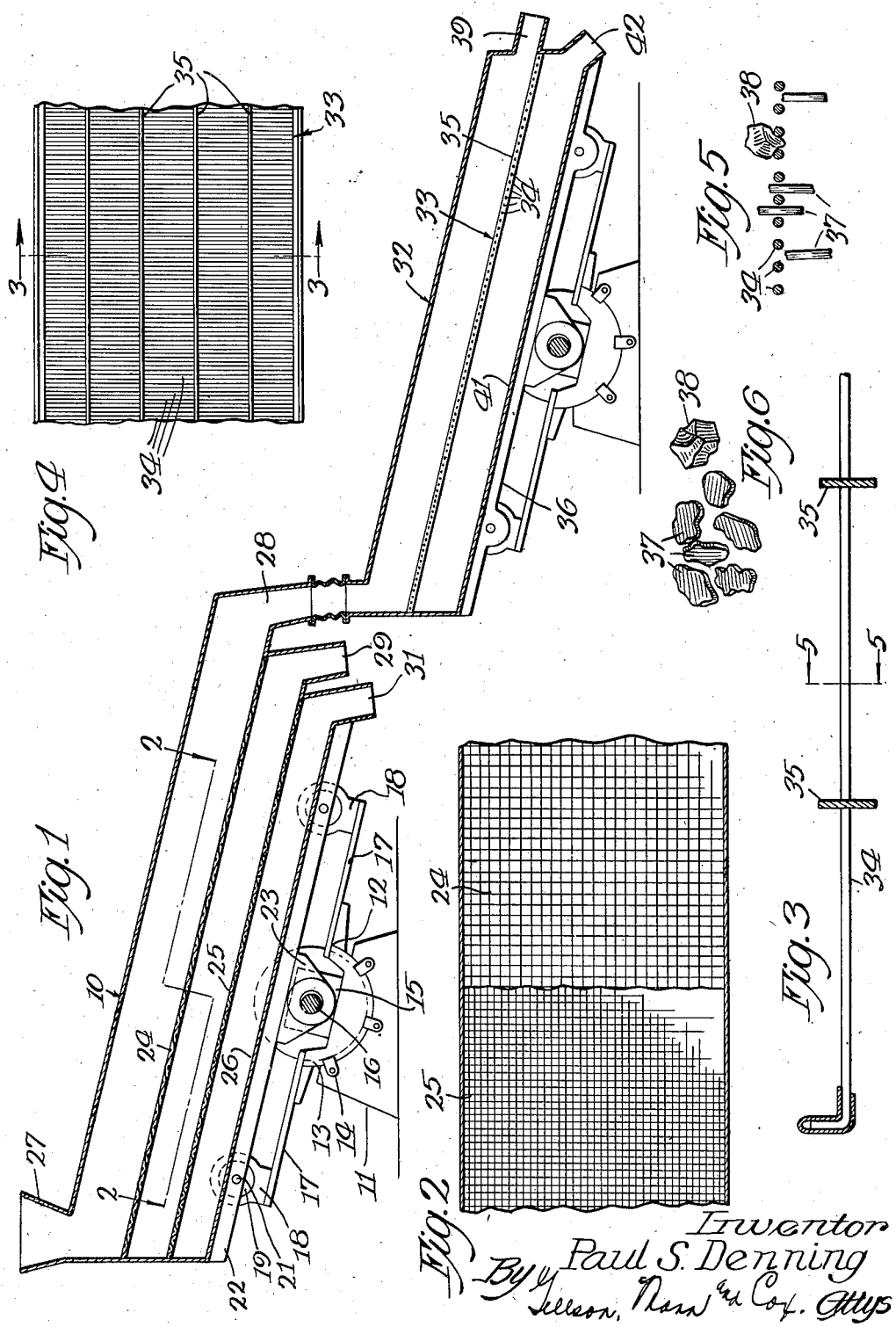
Inventor
Paul S. Denning Patented Oct. 27, 1936

2,058,959

UNITED STATES PATENT OFFICE 2,058,959

METHOD OF SEPARATING FOREIGN MATTER FROM VERMICULITE

Paul S. Denning, Joliet, Ill., assignor to F. E. Schundler & Co., Inc., a corporation of Illinois Application March 5, 1934, Serial No. 714,017

1 Claim. (Cl. 209—2)

This invention relates to the method and apparatus for separating foreign matter from micaceous material.

The principal object of the invention is the provision of a new and improved method of removing micaceous material from ground stone and other foreign matter by the aid of screens and the like.

A further object of the invention is the provision of an apparatus for, and a new and improved method of, grading micaceous material and of removing foreign matter therefrom.

A still further object of the invention is the provision of a new and improved method of removing foreign matter from micaceous material that is extremely efficient, requires a minimum amount of machinery and a method well adapted to use in connection with quantity production.

Other and further objects and advantages of the invention will appear from the following description, taken in connection with the accompanying drawing, in which—

Fig. 1 is a vertical section of the apparatus for separating stone and other foreign matter from particles of vermiculite;

Fig. 2 is a section on the line 2—2 of Fig. 1;

Fig. 3 is a section on the line 3—3 of Fig. 4;

Fig. 4 is a plan view of one of the screen elements;

Fig. 5 is a section on the line 5—5 of Fig. 3; and

Fig. 6 is a perspective view of a quantity of mixed vermiculite and stone particles.

Vermiculite in the crude state is associated with stone and when reduced to the desired sizes preparatory to expanding the same, the particles of stone are so nearly the size of the particles of vermiculite that great difficulty has been experienced in separating the same from the ground stone. It has been proposed to employ centrifugal devices, air separation and even screens for separating the ore from the crushed stone, but without satisfactory results owing to the inefficiency of the device or because of failure to employ the proper method, or because of the prohibitive costs of installation and operation of devices for accomplishing this function. Considerable experimentation has been done in an endeavor to devise a screening system that would remove the stone particles, which, in some materials, amount to as much as from 20% to 30% of the mass. The removal of particles of rock from the ground vermiculite by means of screens is complicated by the fact that the vermiculite particles, while comparatively thin due to their micaceous nature, are, nevertheless, of substantially the same dimensions as to length and breadth as the rock particles. The present invention employs a method wherein screens may be used for effecting the separation prior to expanding the vermiculite. This method comprises, first, grading the material—that is, separating the entire mass into classes or grades according to size—in which the particles of each class or grade, respectively, are of substantially the same length and breadth and then separating the vermiculite particles from each of the classes or grades.

On the drawing is illustrated one embodiment of an apparatus for performing this method.

Referring now to Fig. 1, the reference character 10 designates generally a screen for grading and separating material. In the form of construction shown, the screen is of the adjustable vibrating type and comprises a support or base 11 having a concave recess 12 in its upper edge which receives an adjusting quadrant 13, which is adapted to be angularly adjusted on the support 11 and held in adjusted position by the clamps 14. A bearing 15 for the operating shaft 16 is carried by the quadrant 13 and is provided with arms 17 extending longitudinally of the vibrating screen at each side thereof. These arms are provided with upwardly extending supporting members 18 each of which has a circular opening therethrough for receiving a resilient block of rubber or the like 19, which in turn is mounted on a supporting stud 21 secured to the body 22 of the screen. The body 22 of the screen is provided with bearings 23 in which is journaled an eccentric on the operating shaft 16. The rotation of the shaft 16 will cause a vibration of the body 22 of the screen. Since the details of the operating mechanism of the screen constitute no part of the present invention, it is not thought necessary to further illustrate or describe the same.

Any suitable number of screen elements may be employed. In the form of construction shown, two screen elements 24 and 25 are utilized, although it is understood that if desired only one may be employed for each screen apparatus and the material passing through the screen element subjected to further screening process. These elements 24 and 25 are formed of foraminous or reticulated material, such as screen wire or the like. The mesh of the screen 24 is much coarser than that of the screen element 25. The body of the screen is provided with a bottom portion 55

26 below the screen 25 and at its upper end is provided with a hopper 27 through which the material enters the vibrating screen.

The opposite end of the body 22 of the screen is provided with chutes or discharge passages 28, 29 and 31 through which the material from the screen elements 24 and 25 and the bottom or floor 26 is adapted to be discharged.

In the operation of this portion of the device, the material is introduced through the hopper 27 onto the screen element 24 and the particles of vermiculite and crushed stone which are too large to pass through the mesh of the screen element will move downwardly along the screen element and be discharged together through the conduit 28. The smaller sized material that falls through the screen element 24 will fall onto the screen element 25 and a further separation will take place, the larger of these particles being discharged through the chute or passage 29 which may be conveyed to bins or screens for separating the stone from the particles of vermiculite. Likewise, the material that is discharged from the chute or passage 31 may be conveyed to bins or other screens.

Suitable means are provided for separating the particles of vermiculite from the mass of material that is discharged through each of the discharge passages or chutes 28, 29 and 31. If desired, this mechanism may be so related to the vibrating screen 10 that the operation is continuous. For illustrative purposes, there is shown a vibrating screen 32 for separating the vermiculite particles from the mass discharged through the passage 28. While only one screen is shown, it is understood that others may be used for receiving the discharged material from the chutes or discharge passages 29 and 31. Since the adjusting and vibrating mechanism of the screen 32 is substantially the same as that of the vibrating screen 10 described above, it is not thought necessary to repeat the description. In this device, a single screen element 33 is employed for separating the vermiculite from the stone and other foreign matter. The screen element 33, as shown in Fig. 4, comprises a plurality of screen wire or rods 34 arranged parallel to form elongated narrow slots at each side thereof. Suitable reinforcing plates 35 extend longitudinally of the body 36 of the screen for spacing and supporting the screen wire or rods 34 (see Fig. 3). Preferably, though not necessarily, the screen wire or rods 34 extend transversely to the body 36 of the screen. The wires or rods 34 are arranged a sufficient distance apart to permit the particles of vermiculite 37 which are relatively thin to pass edgewise between the same, as shown in Fig. 5.

The particles of stone 38 and other foreign matter having a length and breadth substantially that of the vermiculite particles but having a greater thickness will not pass between the bars or rods 34 and will pass along the screen element 35 to the discharge passage or conduit 39. The shaking of the screen will cause the vermiculite particles 37 as they pass along the screen element 33 to pass edgewise through the screen onto the floor 41 of the body 36 of the screen. Passing down the floor 41 they will be discharged through the opening 42 into a bin or other receptacle.

Since in practically all vermiculite ore there is more or less stone amounting, in some ores, to as much as 30%, it is highly advantageous to remove the stone at the mine in order to save freight. This separation may easily be accomplished by the simple method outlined above.

It is thought from the foregoing taken in connection with the accompanying drawing that the construction and operation of my device will be apparent to those skilled in the art, and that changes in size, shape, proportion and details of construction may be made without departing from the spirit and scope of the appended claim.

I claim as my invention:—

A method of grading and separating unexpanded vermiculite and foreign matter which comprises passing the unsized mass as discharged from the mill over a square mesh screen, collecting the rejects from said screen, then separating the vermiculite particles from such collection by a wire screen having elongated openings of a length greater than that of the mesh of the first screen and a width materially less than that of the first screen.

PAUL S. DENNING.